United States Patent [19]

Davis

[11] 4,185,362

[45] Jan. 29, 1980

[54] TENSIONING DEVICE

[75] Inventor: Stephen D. Davis, 309 Mathilda St., Apt. #4, Goleta, Calif. 73017

[73] Assignees: Stephen D. Davis; Laddie D. Davis

[21] Appl. No.: 947,268

[22] Filed: Sep. 29, 1978

Related U.S. Application Data

[63] Continuation-in-part of Ser. No. 807,903, Jun. 20, 1977, abandoned.

[51] Int. Cl.² ............... F16G 11/04; F16G 11/10
[52] U.S. Cl. ..................... 24/134 L; 24/134 R; 403/210
[58] Field of Search .......... 24/134 R, 134 P, 134 L, 24/134 KB, 134 KA; 403/210, 211; 188/65.1, 65.2; 182/5, 133

[56] References Cited

U.S. PATENT DOCUMENTS

| 895,590 | 8/1908 | Sprague | 24/134 KB |
| 1,498,048 | 6/1924 | Lee | 188/65.2 |
| 2,226,937 | 12/1940 | Masset | 188/65.1 |
| 2,561,514 | 7/1951 | Brake | 188/65.2 |

Primary Examiner—Bernard A. Gelak
Attorney, Agent, or Firm—Alan T. McDonald

[57] ABSTRACT

A tensioning device for maintaining tension in ropes, cables and the like is disclosed. The device includes a boss member over which one of the lines passes and which changes the direction of the line and a pair of pivoting gripping members which are designed to allow one of the lines to pass freely in one direction but to prohibit motion of the line in the opposite direction. The device may be employed to tension lines such as tent lines, clotheslines and the like.

3 Claims, 6 Drawing Figures

TENSIONING DEVICE

CROSS-REFERENCE TO RELATED APPLICATIONS

This is a continuation-in-part of U.S. Application Ser. No. 807,903, filed June 20, 1977 now abandoned.

BACKGROUND OF THE INVENTION

Ropes, cables and other such lines are often employed to stabilize and erect various objects. Typical of such uses for these lines is the erection of tents, clotheslines and the like and the stabilization of poles, antennas and the like. In order that the elements being retained in place by the lines employed are securely retained, it is important to tension the lines as taut as possible. In the past, either turnbuckles or various knots have been employed to maintain tension in the lines. Knots can only be as tight as origionally tensioned. Further, knots tend to loosen over time, thus the tension does not remain at the origional level. Turnbuckles do maintain even tensions, however, they often are difficult to erect. It is desirable, therefore, to provide a tensioning device for various types of lines which is simple for a single operator to use and which maintains a constant tension on the lines without slippage.

THE PRESENT INVENTION

By means of the present invention these desirable results are accomplished. The present invention comprises a tensioning devise including means for guiding one of a pair of lines through the device in a first direction and for restricting movement of the line through the device in the opposite direction. The device further includes a spring-loaded means for removing tension from the lines when it is desired to remove the structure being restrained by the lines or for whatever other reason it is desired to slacken the lines. The device allows a pair of lines to be connected at the point of the device and provides for varying the tension on the lines.

BRIEF DESCRIPTION OF THE DRAWINGS

The present invention will be more fully described with reference to the drawings in which.

DETAILED DESCRIPTION OF THE DRAWINGS

Figure 1:
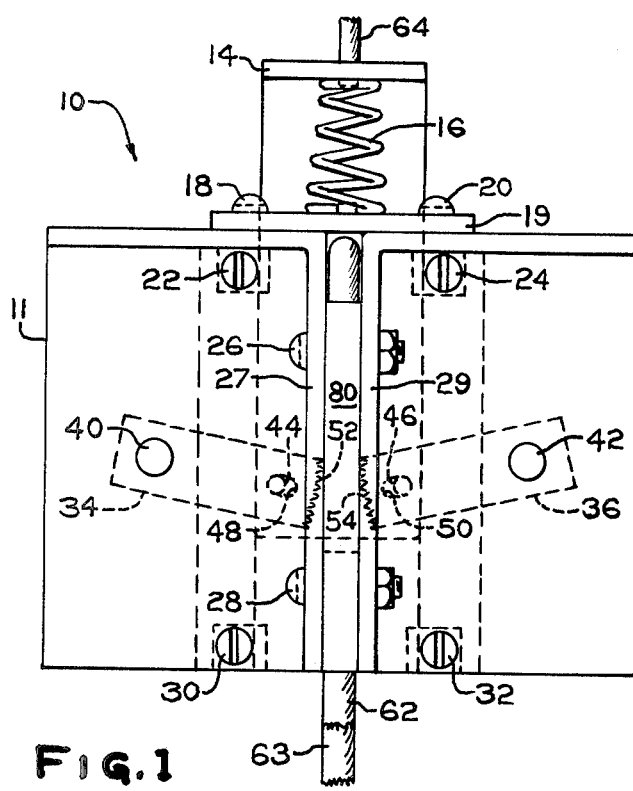
FIG. 1 is a front elevational view illustrating the tensioning device in its closed position to allow one of the lines to pass through the device in one direction but to restrict passage of the line in the opposite direction.
Figure 3:
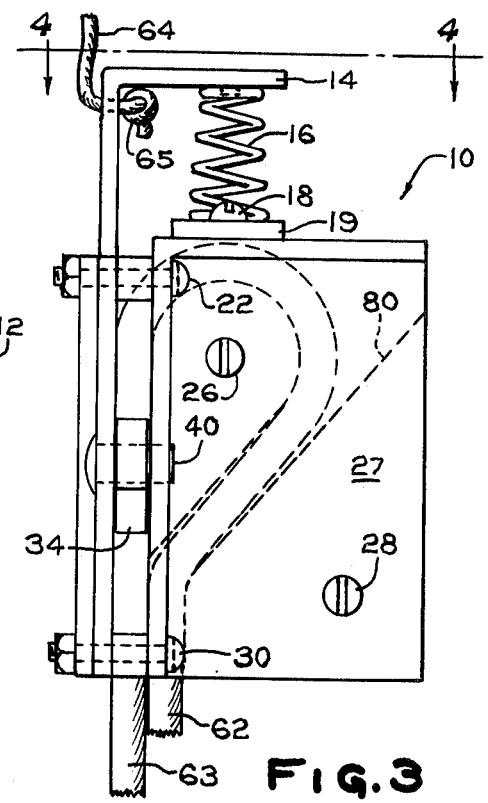
FIG. 3 is a side elevational view illustrating the guiding or boss member employed to reverse the direction of travel of one of the lines.
Figure 2:
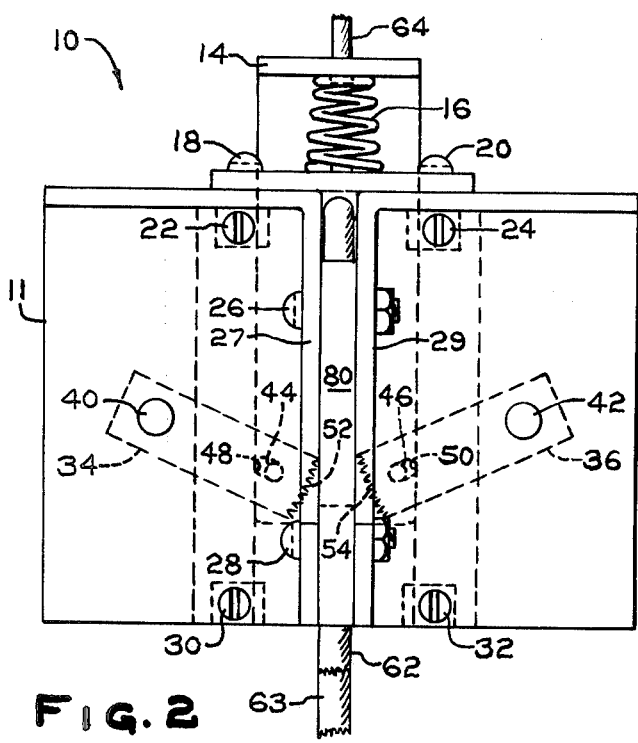
FIG. 2 is a front elevational view illustrating the tensioning device in its open position to allow the line to pass therethrough in either direction.
Figure 4:
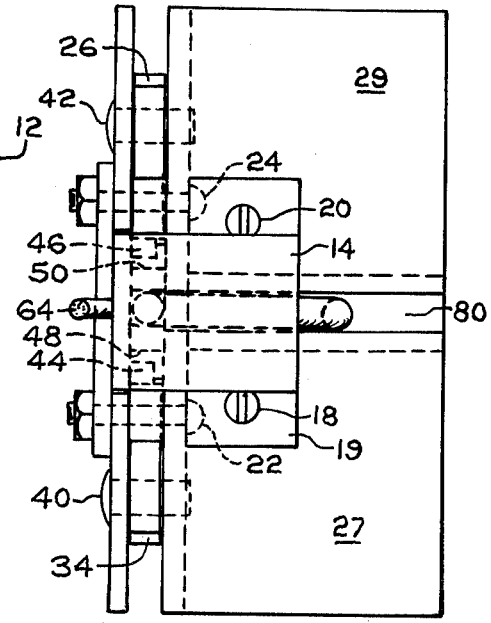
FIG. 4 is a top elevational view illustrating the relation between the guiding and tensioning members.

Turning now to the Figures, the tensioning device of the present invention is illustrated. The device 10 is shown connected to a pair of lines 61 and 64. The line 64 is connected to the device 10 by means of a knot 65 through a connecting means comprising an opening 13 in the release member 14, which member will be more fully described below. The line 61 is looped through the device 10. The line 61 passes over boss member 80 and ends 62 and 63 of the line 61 extend from the device 10. End 63 of the line 61 passes between grippers 34 and 36. These grippers 34 and 36, having gripping surfaces 52 and 54 respectively, are pivotly-mounted to walls 11 and 12 respectively through pins 40 and 42 respectively such that the grippers 34 and 36 may rotate about the pins 40 and 42. In addition, they are mounted on release member 14 by pins 48 and 50 respectively through slots 44 and 46 respectively, such that the grippers 34 and 36 may slide about the pins 48 and 50. Optionally, a single gripper could be mounted on bolt 26 in a crosswise manner.

When line 61 is to be tensioned with line 64, line end 63 is pulled through the device 10. Due to the pivoted mounting of the gripping members 34 and 36, while the end 63 may be passed through the device 10, if end 62 is pulled the line 61 cannot pass back through the device 10, since spring 16 is biased to act on release member 14 to close grippers 34 and 36. In addition, increased tension between lines 61 and 64 acts on release member 14 to close the grippers 34 and 36. Further, when lines 61 and 64 are tensioned, due to the pulling on end 63, the line 61 cannot pull back when the grippers 34 and 36 are closed, thus maintaining the level of tension originally placed on the lines 61 and 64.

When it is desired to remove the tension on the lines 61 and 64, release member 14 is pushed downwardly towards stationary walls 27 and 29 and spring 16 is compressed. This action, which overcomes the bias of spring 16 and pushes the pins 48 and 50 downwardly, also forces the grippers 34 and 36 downwardly and spreads or opens the gripping surfaces 52 and 54 so that the line 61 can reverse its direction through the device 10 and pull on end 62 is now possible.

Figure 5:
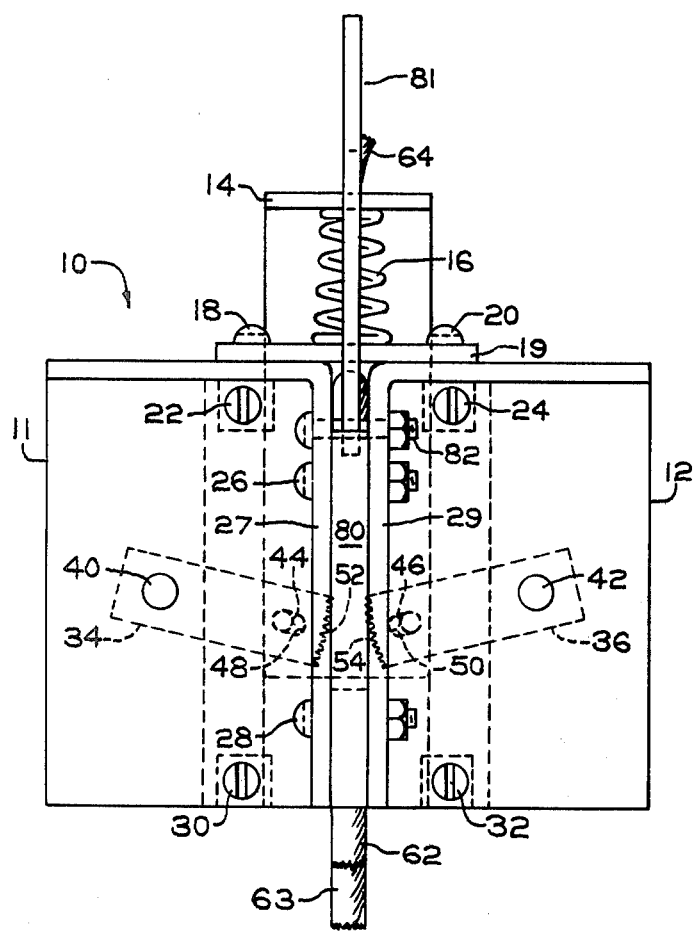
FIG. 5 is a front elevational view, simular to FIG. 1, but including a cam member for activating the spring-loaded release means.
Figure 6:
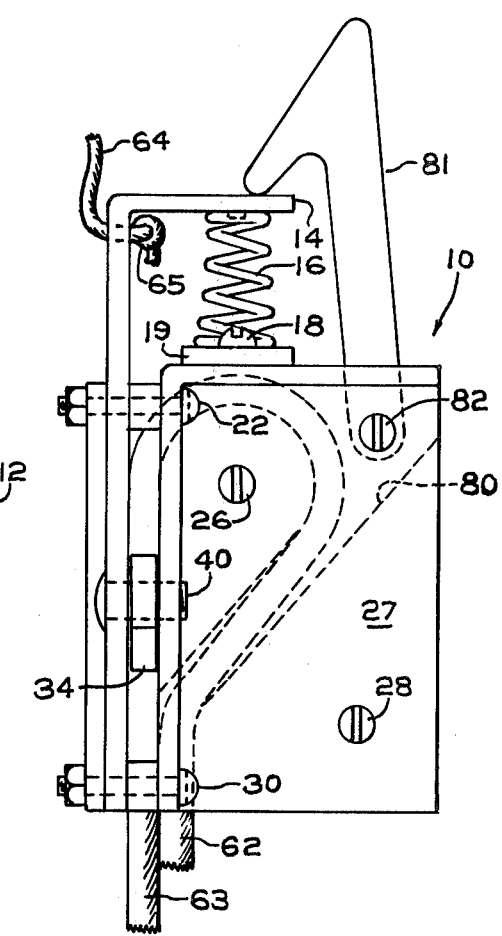
FIG. 6 is a side elevational view, simular to FIG. 3, illustrating the cam member.

When lines of high elasticity are employed, the release member 14 can be operated under hand pressure to open the grippers 34 and 36. Optionally, as illustrated in FIGS. 5 and 6, a cam 81 may be employed to overcome the tension of the lines 61 and 64 and the spring 16 to release the tension on the lines 61 and 64 by pressing upon release member 14 to press spring 16 and open grippers 34 and 36. If such a cam is employed, it may be connected between plates 27 and 29 by means of a bolt 82 such that manually rotating the cam 81 about bolt 82 and against release member 14 will press upon release member 14 and compress the spring 16 to release the tension as described above.

The device 10 may be held together through a series of bolts 18, 20, 22, 24, 26, 28, 30, and 32 and optionally 82. Clearly, any other fastening means, such as adhesives, rivots and the like, may be employed.

From the foregoing, it can be seen that the present invention provides a simple system for tensioning lines which can be used by a single person to erect tents, clotheslines and the like without slippage.

While the present invention has been described with reference to presently preferred embodiments thereof, it is not intended to be so limited thereby, except as set forth in the accompanying claims.

I claim:

1. An apparatus for tensioning a pair of lines comprising means for connecting a first of said lines to said apparatus, a boss member for guiding and passing a second of said lines through said apparatus in a first direction, gripping means to prohibit said second line from passing through said apparatus in the opposite direction during tensioning of said lines, said gripping means having gripping surfaces, a pair of stationary walls upon which said grippers are pivotly mounted and a release member upon which said grippers are slideably mounted, said release member being biased by a spring connecting said release member and said stationary walls, said means for connecting said first line to said apparatus being located on said release member, such that upon passing said second line between said grippers in a tensioning direction said grippers allow said second line to pass therethrough and upon passing said second line through said grippers in the opposite direction said grippers pivot with respect to said stationary walls to prohibit said second line from passing therethrough and such that upon activating said release member said release member overcomes the bias of said spring to allow said second line to pass therethrough in the opposite direction to release the tension on said lines.

2. The apparatus of claim 1 wherein said grippers are pin mounted on said release member.

3. The apparatus of claim 1 wherein said release member includes a cam for overcoming the bias of said spring and the tension of said lines.

* * * * *